United States Patent [19]

Baggott

[11] Patent Number: 4,544,024

[45] Date of Patent: Oct. 1, 1985

[54] INSULATED CABINET WITH INTERCHANGEABLE HEAT TRANSFER UNIT

[75] Inventor: George T. Baggott, Cleveland, Ohio

[73] Assignee: Crescent Metal Products Inc., Cleveland, Ohio

[21] Appl. No.: 532,688

[22] Filed: Sep. 16, 1983

[51] Int. Cl.$^4$ .................. F25B 13/00; F25B 29/00
[52] U.S. Cl. .................................. 165/48 R; 62/254; 165/DIG. 26
[58] Field of Search .................. 62/254, 236; 165/DIG. 25, 48 R, 2, DIG. 26; 98/40 C, 31; 312/236; 219/521; 426/394

[56] References Cited

U.S. PATENT DOCUMENTS

| | | | |
|---|---|---|---|
| 3,982,584 | 9/1976 | Spanoudis | 165/DIG. 26 |
| 4,103,736 | 8/1978 | Colato et al. | 165/DIG. 26 |
| 4,203,486 | 5/1980 | Rubbright et al. | 165/DIG. 26 |
| 4,214,706 | 7/1980 | Gee et al. | 98/40 C |

Primary Examiner—Henry Bennett
Attorney, Agent, or Firm—Maky, Renner, Otto & Boisselle

[57] ABSTRACT

Insulated cabinets with interchangeable heat transfer units disposed on the top thereof are disclosed and means for improving the air circulation both in the heat transfer units and within the enclosed cabinet. The heat transfer units may be refrigeration type units, freezer type units, heating type units, warming type units or proofing units. Each of the heat transfer units includes a rectangular opening in the bottom thereof to which is attached a duct through which heated or cooled air is forced. The duct has parallel front and rear walls and inclined side walls which taper to reduce the cross section of the air flow. The duct is a sliding fit inside a tunnel which extends vertically along the back wall of the cabinet. The tunnel is provided with two columns of louvers along its entire length through which the air from the duct flows. Air exiting the louvers is deflected by a baffle plate which extends the full width of the rear of the cabinet. The edge portions of the baffle plate are perforated. The air thus must move out forward through the louvers then laterally across the solid portion of the baffle plate before turning forward again through the perforations in the baffle plate into the interior of the cabinet. The improved air flow greatly reduces temperature differences within the cabinet when used as an oven, and the air flow over the heating elements is more uniform, reducing hot spots and thus prolonging their life.

4 Claims, 8 Drawing Figures

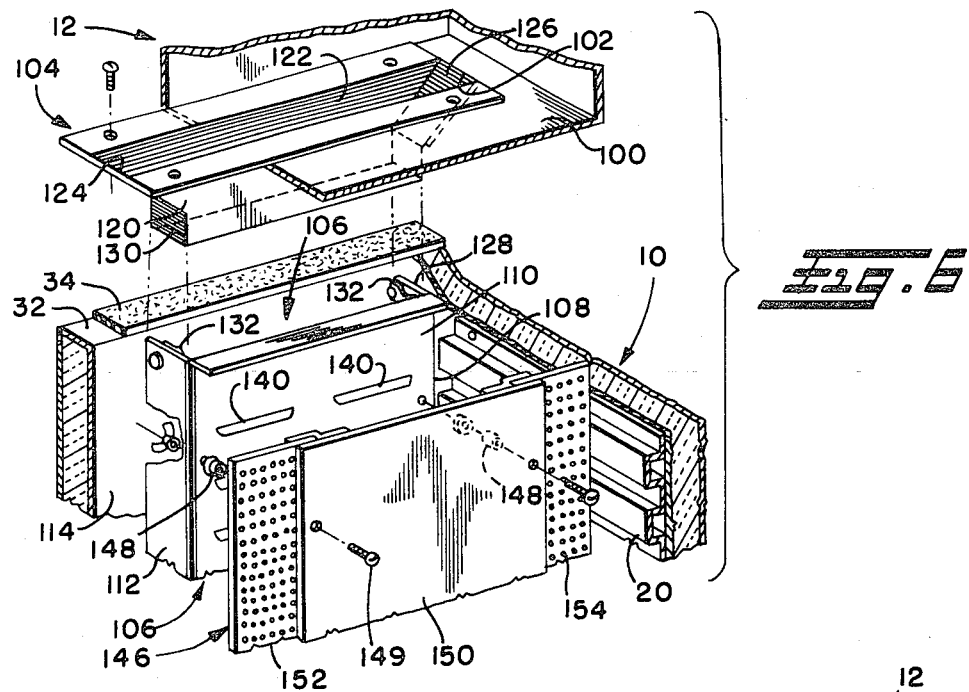
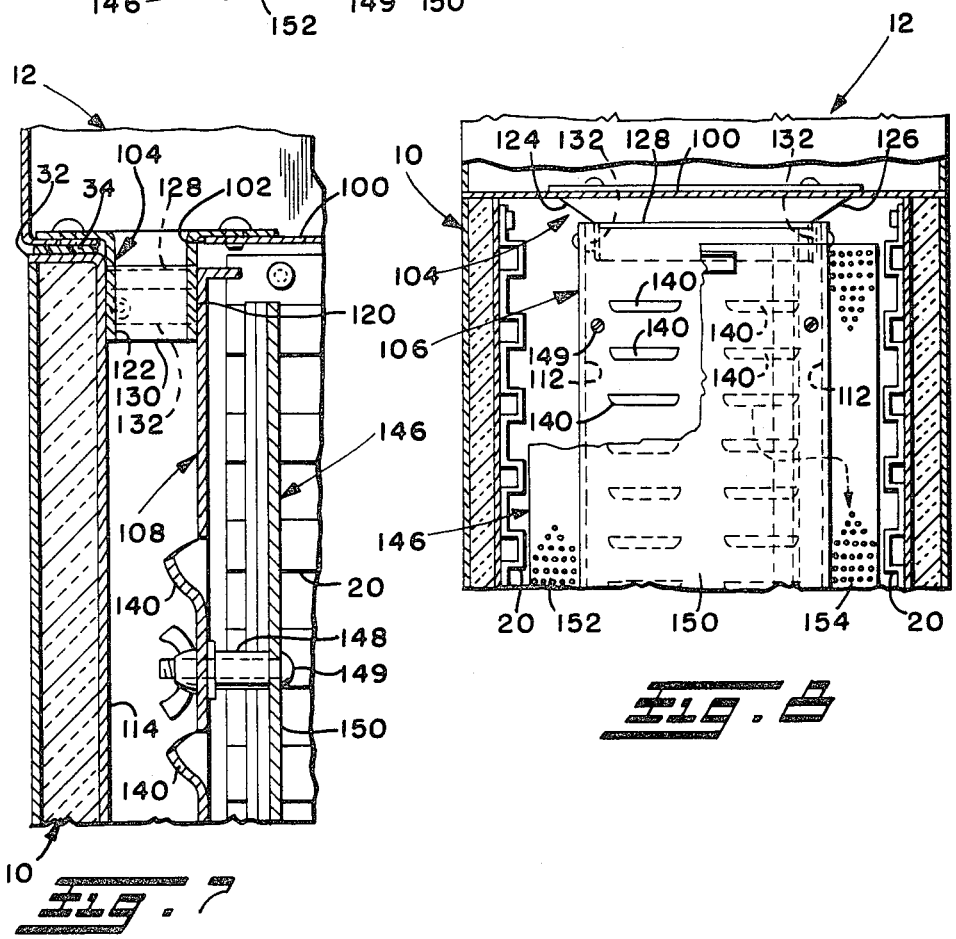

INSULATED CABINET WITH INTERCHANGEABLE HEAT TRANSFER UNIT

BACKGROUND OF THE INVENTION

The present invention relates to commercial cooking and refrigeration equipment. Specifically, the present invention relates to an insulated cabinet, interchangeable heating or refrigeration units which can be connected with the cabinet, and an improved connection for channeling air from the heating or cooling units and distributing it within the cabinet.

In the past it has been proposed to build insulated cabinets for use in commercial kitchens or by caterers to which may be attached any of a number of heat transfer units. Typically the cabinets stand about six feet tall and are approximately two feet wide. Both shorter and wider cabinets are available. Shelves are easily installed at different levels within the cabinet to accommodate food items of different heights. It is intended that a large number of food products be accommodated simultaneously, for example dozens of loaves of bread or a large number of roasts.

The heat transfer units which fit on top of the cabinets may be refrigeration or freezer units, warming units or baking units, among others. Each of the heat transfer units includes an air intake, a fan or fans, a heating or cooling device to transfer heat to or from the air, and an outlet for heated or cooled air. The units are intended to be positioned over and sealed against an opening in the top of the cabinet. The air inlet then communicates directly with the cabinet interior while the treated air outlet communicates with a vertically extending tunnel on the rear wall of the cabinet. The fan(s) draws air from the intake, forces it past the heating or cooling device, through the outlet, into the tunnel, and then through many louvers in the tunnel walls into the interior of the cabinet.

The outlet of prior art heating or cooling units is formed by a rectangular opening in the bottom or floor of a chamber in which the heating elements or refrigeration evaporator are located. A short, parallelsided duct makes an extension of the rectangular opening and leads to the top of the tunnel which has a slightly larger rectangular cross section than the duct so that the end portion of the duct fits inside the top of the tunnel.

The tunnel is made of sheet metal and extends vertically along the cabinet back with louvers in the front face and perforations in the side walls. The back of the cabinet closes the back of the tunnel. Vertically, the tunnel is divided by the pattern of louvers, a single column of louvers being formed in the top half of the tunnel's front wall, and a double column of louvers being formed in the bottom half of the tunnel's front wall. A baffle plate for diffusing heated or cooled air exiting from the louvers is located in front of the tunnel wall. The baffle plate has a solid central portion and perforations along vertically extending edge portions. Heated or cooled air exiting the tunnel through the louvers and the side wall perforations of the tunnel pass through the perforations on the lateral edge portions of the baffle and into the interior of the cabinet.

Even distribution of air is important for proper operation of devices of this sort, especially where the heat transfer unit is a heating unit and the device is operated as an oven. Within the cabinet itself uniform air flow is important to even cooking of the foods within. Where there are substantial temperature variations between the top and bottom of the cabinet, foods on the bottom shelf will be cooked in a different length of time from foods on the top shelf, possibly with distasteful results.

Of equal concern is air flow over the heating elements themselves. If there are stagnant pockets or corners surrounding the heating elements where the air flows less rapidly than elsewhere, the heating elements may overheat, shortening their lifespan appreciably.

SUMMARY OF THE INVENTION

The present invention provides a cabinet which receives any of a number of heat transfer units and a tunnel and air outlet which provide for more even air distribution both within the cabinet and over heating elements in the heat transfer units. The result is longer life for the heating elements and more uniform temperatures within the cabinet.

The improved air flow is achieved by an enlarged opening in the floor of the heat transfer unit through which heated or cooled air is drawn and by a change of the arrangement of the louvers in the front tunnel wall, although the cross section of the tunnel is not changed from prior art devices. A tapered duct leads from the enlarged opening into the tunnel, while the tunnel itself has two uniform columns of louvers along its entire length and perforations in the lateral side walls of the tunnel have been eliminated.

The invention, then, comprises the features hereinafter fully described and particularly pointed out in the claims, the following description and annexed drawings setting forth in detail illustrative embodiments of the invention, these being indicative, however, of but a few of the various ways in which the principle of the invention may be carried out.

BRIEF DESCRIPTION OF THE DRAWINGS

In the drawings:

FIG. 6 is an exploded, perspective illustration of a portion of the heat transfer unit and cabinet of FIG. 1;

FIG. 7 is a cross sectional view of the rear wall portions of the heat transfer unit and cabinet of FIG. 1; and FIG. 8 is a partially cut away front elevation view of a portion of the rear wall of the cabinet and heat transfer unit of FIG. 1.

DESCRIPTION OF PREFERRED EMBODIMENTS

Figure 1:
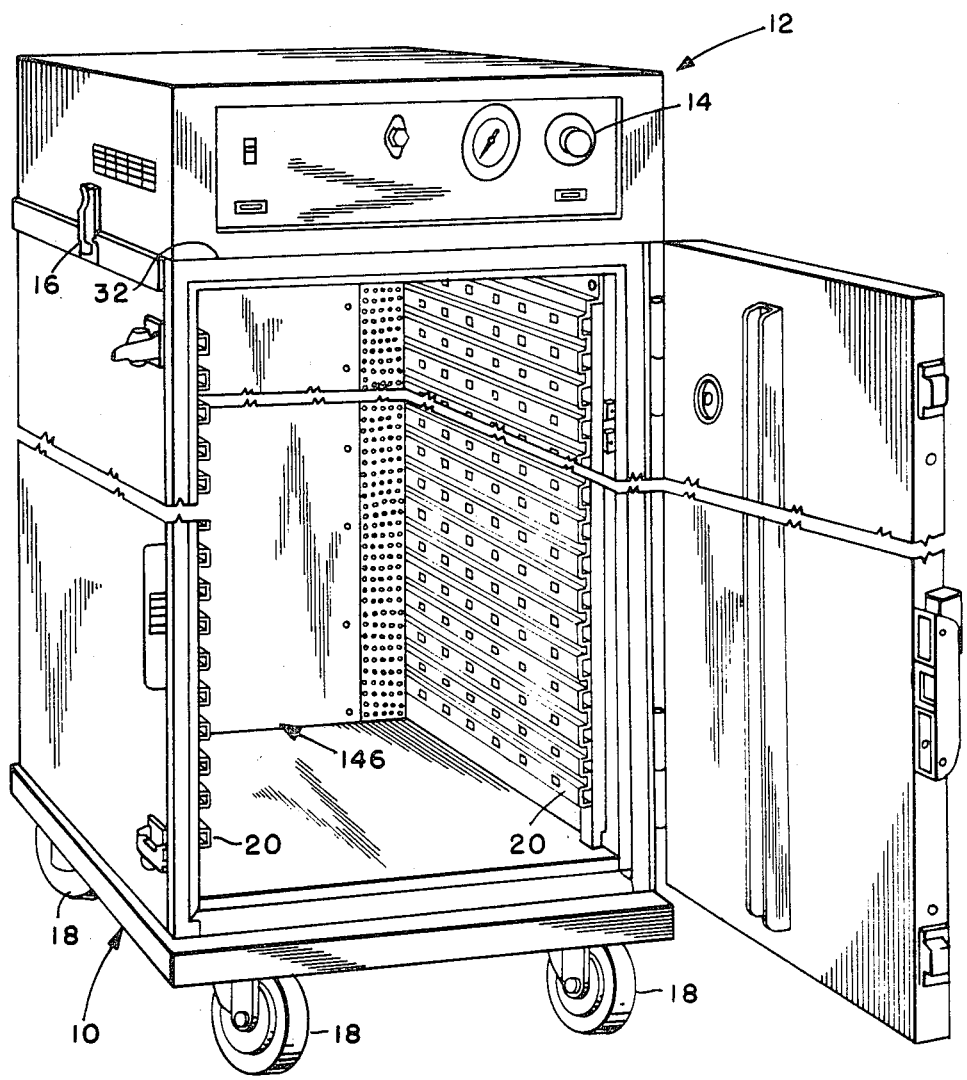
FIG. 1 illustrates a cabinet and a heat transfer unit mounted on top of the cabinet and constructed in accordance with the present invention.

FIG. 1 illustrates a cabinet 10 with a heat transfer unit 12 on top for use by a caterer or in a commercial kitchen. The heat transfer unit 12 is a heating unit with appropriate thermostatic controls 14. The heating unit 12 is secured to the top of the cabinet 10 by means of spring loaded fasteners 16 on each side thereof (one not shown). The heating unit 12 fits over and closes an opening in the top of the cabinet.

The cabinet 10 may be mounted on wheels 18 for easy movement and may be approximately six feet tall and two feet or more wide. The cabinet 10 may also be shorter or wider, depending on kitchen requirements. The cabinet 10 is fitted with conventional removable corrugated side walls 20 or an angle ledge interior to receive trays or racks of food to be cooked, cooled, heated, frozen, etc., depending upon the particular function of the heat transfer unit installed on the top of the cabinet 10. In use, several racks or trays may be installed so that a large quantity of food may be cooked or cooled at one time.

Any of a number of different heat transfer units may be used with the cabinet 10, and several are illustrated schematically in FIGS. 2-5. All of the units include a flat downwardly facing perimeter surface 30 which is adapted to engage the top perimeter surface 32 (FIGS. 1 and 6) of the cabinet 10. A strip of heat and cold resistant gasket material 34 may be used to seal the connection between the lower perimeter surface 30 of the heat transfer units and the topmost surface 32 of the cabinet 10. The topmost cabinet surface 32 of the cabinet 10 on which the perimeter 30 of the heat transfer units rest defines a rectangular opening communicating directly with the interior of the cabinet 10. Each of the heat transfer units draws in air through this opening from the interior of the cabinet for either heating or cooling.

Figure 2:
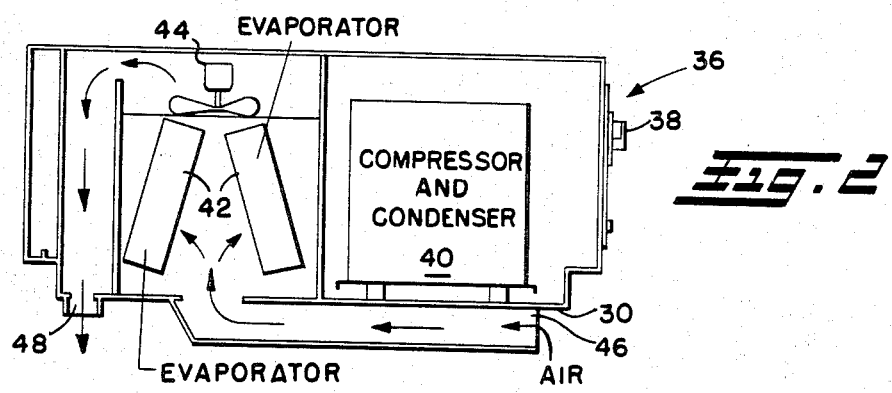
FIG. 2 illustrates schematically a freezer-type heat transfer unit for use with the cabinet shown in FIG. 1.

FIG. 2 illustrates a freezer-type heat transfer unit 36 with controls 38 on its front panel. The freezer unit 36 is adapted to fit sealingly on top of a cabinet such as cabinet 10 of FIG. 1. The freezer unit includes a compressor and condenser assembly 40, a pair of evaporators 32 and a fan 44. Air is drawn in from the cabinet interior through an inlet duct 46 and through the evaporators 42 by the fan 44 before being discharged through an outlet 48 back into the interior of the cabinet 10.

Figure 3:
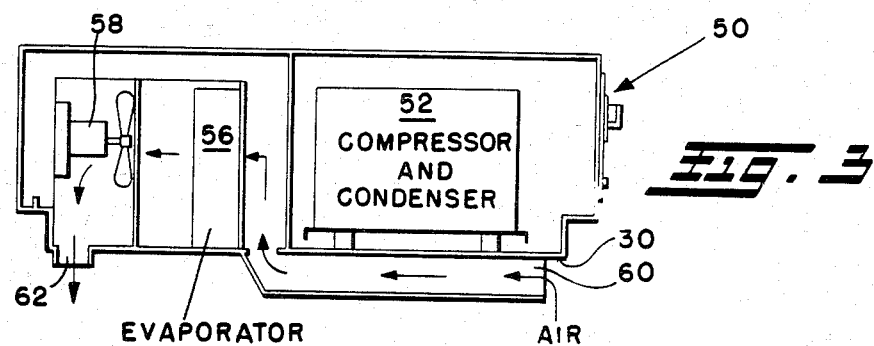
FIG. 3 illustrates schematically a refrigeration-type heat transfer unit for use with the cabinet of FIG. 1.

FIG. 3 illustrates a refrigeration unit 50 generally similar to the freezer unit 36 of FIG. 2. The refrigeration unit 50 includes a relatively small compressor and condenser assembly 52, a single evaporator 56, and a fan 58. Air is drawn in from the cabinet interior through an inlet duct 60 and pulled through the evaporator 56 by the fan 58 before being returned through outlet 62 into the interior of the cabinet.

Figure 4:
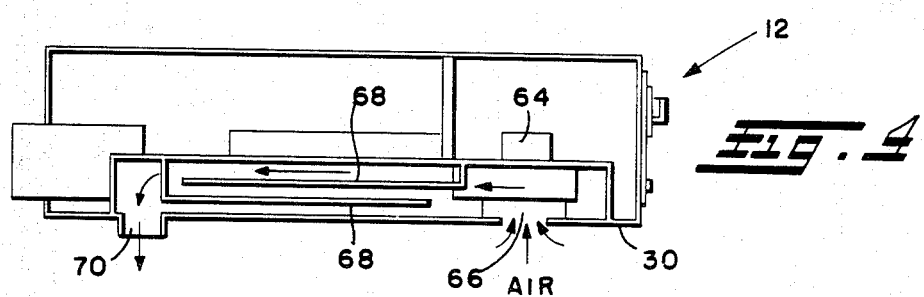
FIG. 4 is a schematic cross sectional view of the heat transfer unit shown in FIG. 1.

FIG. 4 illustrates the heating unit 12 shown in FIG. 1. The heating type heat transfer unit 12 includes three fans 64 (only one shown) which in total move about 250 cubic feet of air per minute. The fans 64 draw air in through inlet 66 and past a pair of electric resistance heating elements 68 which together draw about 8,000 watts. After passing over the heating elements 68, the air is forced out through outlet 70 to return to the interior of the cabinet 10.

Figure 5:
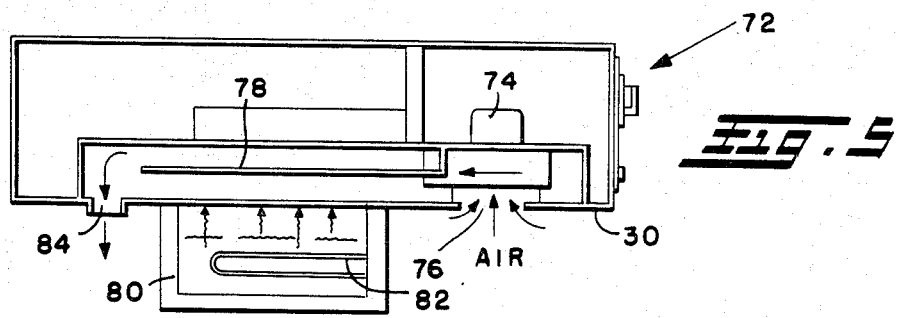
FIG. 5 is a schematic illustration of another type of heat transfer unit for use with the cabinet of FIG. 1.

FIG. 5 is a schematic illustration of a proofing unit, so called because it is used primarily for proofing yeast doughs. The proofing unit 72 includes two fans 74 having a total capacity of about 170 cubic feet of air per minute. Air is drawn from the interior of the cabinet 10 through inlet 76 and over a single resistance heating element 78. The heating element 78 may be approximately a 1,000 watt heating element. In addition, the proofing unit 72 includes a water pan 80 equipped with a 2,000 watt heating element 82. The heating element 82 vaporizes water in the pan 80 causing it to mix with the air blown by fan 74. Thus the air returning through outlet 84 to the interior of the cabinet 10 is not only heated but also moistened. This is especially good for rising yeast doughs and for keeping warm foods which might otherwise tend to dry out.

The outlets 48, 62, 70, and 84 of each of the heat transfer units 36, 50, 12, and 72 of FIGS. 2-5, respectively, are essentially the same. Each unit, e.g. heating unit 12 (FIG. 6), includes a flat bottom plate 100 which is coplanar with the perimeter surface 30, at least in the region of the rear of the cabinet. A rectangular opening 102 (FIGS. 6 and 7) is formed through the bottom plate 100 and connects the interior of the cabinet 10 with the path of flow of the heated or cooled air through the respective heat transfer unit. The opening 102 is approximately 16 inches from side to side and 2 inches from front to back. The fan of each of the heat transfer units, e.g. fan 64 of unit 12, blows air through the opening 102 through a duct 104 into a vertically extending tunnel 106 in the back of the cabinet 10.

The tunnel 106 is formed by a U-shaped sheet metal member 108 with a flat front face 110 and parallel side faces 112 which are perpendicular to the rear surface 114 of the interior of the cabinet 10. The interior of tunnel 106 is approximately 12 inches wide and 2 inches deep.

Duct 104 is tapered to accommodate the difference between the 16-inch wide opening 102 and the 12-inch wide tunnel 106. To this end of duct 104 is funnel shaped with parallel front and rear walls 120 and 122 and oppositely inclined end walls 124 and 126 (FIGS. 6 and 8). The front and rear walls 120 and 122 are just less than 2 inches apart so that they fit between the rear surface 114 (FIG. 7) of the interior of the oven and the inside of the front tunnel wall 110. At their upper ends the inclined end surfaces 124 and 126 (FIGS. 6 and 8) abut the short edges of the opening 102 which are 16 inches apart, and at their lower edges are approximately 12 inches apart so that they align with the side walls 112 of the tunnel 106. The topmost perimeter 128 of the tunnel 106 is approximately 1¾ inches below the top 32 of the cabinet 10 so that the inclined surfaces 124 and 126 form approximately a 38° angle with the horizontal.

The duct 104 includes a short parallel sided extension 130 which fits down inside the uppermost portion of the tunnel 106 approximately ½ inch. Spring clips 132 mounted to the interior of the lateral side walls 112 of the tunnel 106 secure the rectangular extension 130 of the duct 104 against vibration.

The added width of the top of the duct 104 (16 inches instead of 12) and the opening 102 greatly improves the air flow characteristics within the housing of the heat transfer unit 12. Air circulation there is much more thorough than with a smaller, 12-inch wide opening and a straight sided duct as in the prior art. The duct 104 reduces the number of hot spots on the heating elements and therefore provides a longer life. In cooling units such as the freezer unit 36 or the refrigeration unit 50, improved air flow means that the evaporators 42 and 56 will not have some portions of their surfaces working harder than others. Frost is therefore less likely to build up and the unit may be more economically proportioned.

The tunnel 106 is provided with louvers 140. Each louver 140 is formed by deforming metal of the tunnel 106 backward toward the interior of the tunnel to form a scoop to receive air from the duct 104. Each louver 140 projects backwards approximately a half inch from the interior surface of the front 110 of the tunnel, and each louver is approximately four inches wide. The tunnel front wall 110 includes two columns of louvers 140 (see FIG. 8). The two columns are approximately one inch apart and within each column the louvers 140 are spaced vertically from each other by about three inches. Air blown through the duct 104 into the tunnel 106 exits the tunnel through the louvers 140. The side walls 112 of the tunnel are solid.

A baffle plate 146 deflects and diffuses the air from the tunnel 106. The baffle plate 146 is mounted by means of stand-off spacers 148 and suitable threaded fasteners 149 to the front wall 110 of the tunnel 106. The baffle plate 146 extends the full width of the interior of the cabinet 10 from left to right between the two corrugated side walls 20 (FIG. 8). The standoff spacers 148 hold the baffle plate 146 approximately one inch away from the front wall 110 of the tunnel 106 and has a solid central portion 150 approximately the same width as the width of the front wall 110 of the tunnel 106.

A pair of vertically extending perforated strips 152 and 154 are attached to opposite vertical edge portions of the central solid plate 150. Although shown as separate pieces, the perforated strips 152 and 154 could be integrally formed with the plate 150. The perforated strips 152 and 154 extend the entire vertical length of the baffle plate 146. The perforated strips 152 and 154 close the space between the vertical edges of the solid plate 150 and the corrugated racks 20 lining the side walls of the interior of the cabinet 10.

Air flow from any of the fans of the heat transfer units illustrated in FIGS. 2-5 is forced into the duct 104 where the cross sectional area of the flow is narrowed before flowing into the tunnel 106. The louvers 140 then deflect the air directly as the solid central portion 150 of the baffle plate 146. From there, the air moves laterally as indicated by the horizontal portion of arrow 156 (FIG. 8) and then forward through the perforations into the interior of the cabinet 10.

Test results have shown substantial improvements in distribution of heat within the cabinet 10 as a result of using the duct 104 with tapered sides 124 and 126 and tunnel 106 with a double column of louvers 140 along the entire length thereof. For example, in devices such as the prior art oven it is not uncommon to have temperature variations of approximately 40° or more between locations within the cabinet when the desired temperature is 350° F. The tapered duct 104 and double louvered column of the present invention reduce the temperature difference to about 29° F. invention reduce the temperature difference to about 29° F. or less than 75% of the original temperature difference. This result was achieved with a six kilowatt heating element and a prior art type parallel sided duct leading to a tunnel as described in the Background of the Invention. With other units having different wattage heating elements the temperature range in the cabinet using the present invention may be only 60% or less of the temperature difference of the prior art cabinets. Moreover, improved air flow over the heating elements 68 and 78 in the heating type heat transfer units 12 and 72 of FIGS. 4 and 5 has prolonged the life of the heating elements by eliminating hot spots.

Thus it is clear that the present invention provides a cabinet 10 which may receive any of a number of heat transfer units 12, 36, 50, or 52 and which includes a tunnel 106 and treated air outlet 104 which provide for more even air distribution both over the heating elements and within the interior of the cabinet. The result is a longer life for the heating elements and more uniform temperatures within the cabinet.

The following is claimed:

1. An insulated cabinet assembly comprising an insulated cabinet and an interchangeable heat transfer unit, said cabinet including an opening in the top thereof, said unit including inlet means for receiving air from the interior of said cabinet and outlet duct means for directing air from said heat transfer unit to said cabinet, said cabinet including tunnel means disposed vertically in said cabinet for receiving air from said duct means and distributing the air uniformly within said cabinet, said duct means including two parallel walls and two oppositely inclined walls, said tunnel means including walls defining a passage with a rectangular cross-section, said duct means terminating at its lower end with an extension adapted to fit within said rectangular passage of said tunnel means, said tunnel including two columns of louvers extending the entire length of said tunnel means, and baffle means for deflecting air flowing from said tunnel means through the louvers, said baffle means including a flat plate and perforated edge portions, said louvers being formed in a front facing wall of said tunnel means and said baffle means being parallel to and in front of said louvers, said baffle including a solid portion between said perforations of a widthwise extent at least as large as that of the two columns of louvers.

2. The assembly of claim 1, wherein said oppositely inclined walls are inclined toward each other in the direction of air flow through said duct means.

3. The assembly of claim 2, wherein said tunnel means includes a plurality of parallel columns of parallel louvers.

4. The assembly of claim 1, wherein said baffle extends the full width of said cabinet.

* * * * *